Figure 1:
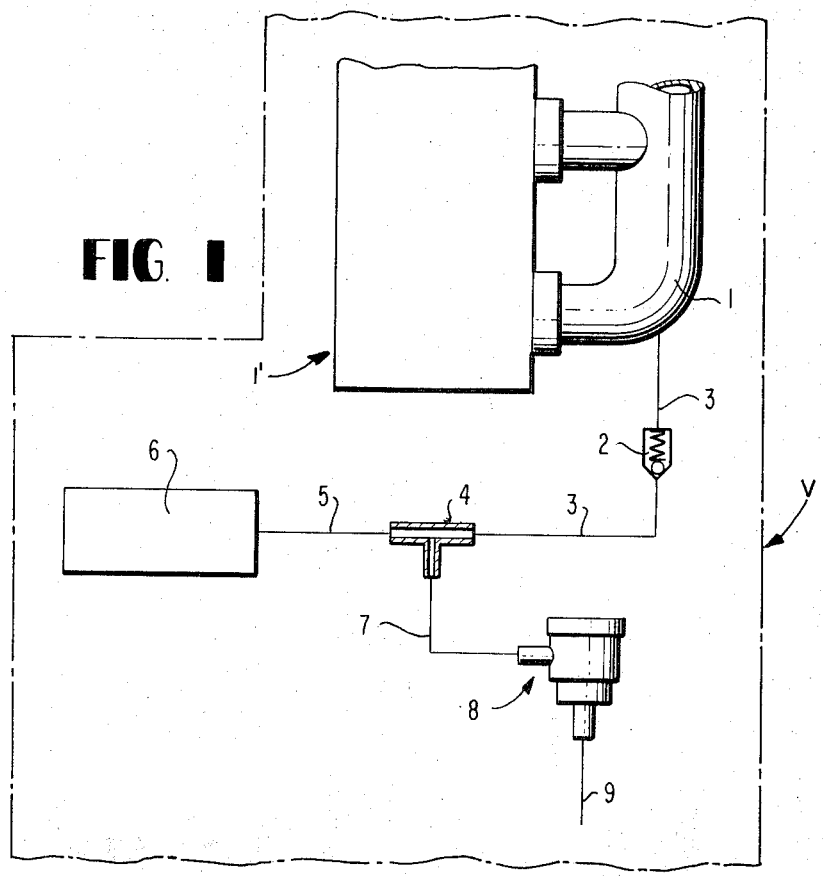

United States Patent [19]

Andres

[11] 3,842,931

[45] Oct. 22, 1974

[54] VEHICLE VACUUM LINE PRIORITY VALVE

[75] Inventor: Rudolf Andres, Sindelfingen, Germany

[73] Assignee: Daimler-Benz Aktiengesellschaft, Stuttgart-Unlerturkheim, Germany

[22] Filed: Mar. 24, 1972

[21] Appl. No.: 237,843

[30] Foreign Application Priority Data

Mar. 25, 1971 Germany............................ 2114589

[52] U.S. Cl............................ 180/103, 137/DIG. 8
[51] Int. Cl............................................... B60t 15/18
[58] Field of Search................. 91/376; 188/181 A; 303/6 R, 9, 21 F, 40; 192/.55; 137/DIG. 8; 251/61.2; 180/79.2, 103

[56] References Cited
UNITED STATES PATENTS

| 2,587,375 | 2/1952 | Paulsen........................... 137/DIG. 8 |
| 2,973,994 | 3/1961 | Wells................................. 303/21 F |
| 3,237,526 | 3/1966 | Hayes et al. ......................... 91/376 |
| 3,272,567 | 9/1966 | Vielmo ................................. 303/40 |
| 3,401,986 | 9/1968 | Walker et al. ................... 188/181 A |
| 3,441,320 | 4/1969 | Flory................................... 303/6 R |
| 3,456,991 | 7/1969 | Valentine et al. ..................... 303/40 |
| 3,481,419 | 12/1969 | Kress ............................. 180/79.2 X |
| 3,481,653 | 12/1969 | Grancon ............................. 303/6 R |
| 3,486,802 | 12/1969 | Cadiou................................ 303/6 R |
| 3,536,176 | 10/1970 | Capa................................... 192/.55 |

Primary Examiner—David Schonberg
Assistant Examiner—Terrence L. Siemens
Attorney, Agent, or Firm—Craig & Antonelli

[57] ABSTRACT

A vehicle, especially a motor vehicle with two adjusting mechanisms which are actuated by an auxiliary force and which are of unequal rank as regards the maintenance of the operating safety; a control device is thereby provided in the line leading to the respective subordinate adjusting mechanism which interrupts a further supply of the auxiliary force when its characteristic magnitude reaches a predetermined value which is still sufficient for the completely satisfactory operation of the next higher ranking adjusting mechanism.

34 Claims, 2 Drawing Figures

VEHICLE VACUUM LINE PRIORITY VALVE

The present invention relates to a vehicle, especially to a motor vehicle with at least two adjusting installations which are actuated by an auxiliary force and which are of non-equal rank for the maintenance of the operating safety.

In many of the present-day vehicles, adjusting mechanisms actuated by an auxiliary force are used. For cost and space reasons several loads are thereby connected to a line functioning as reservoir tank or to a separate tank. For the most part, the different adjusting or actuating mechanisms are not equally important for the maintenance of the operating safety of the vehicle. If now the energy of the auxiliary force which is available, drops off, for example, as a result of a leak in the system, then it may happen that the residual energy does no longer suffice without further measures for a servo-assist brake operation.

It is an aim of the present invention to eliminate such a danger source by an appropriate installation.

Accordingly, a vehicle, especially a motor vehicle with at least two adjusting mechanisms actuated by an auxilliary force and of non-equal rank for the maintenance of the operating safety is proposed, in which according to the present invention a monitoring installation is provided in the line leading to the respective subordinate adjusting installation, which interrupts a further auxiliary force supply when its characterized magnitude reaches a predetermined value still sufficient for the completely satisfactory operation of the next-higher-ranking adjusting mechanism.

In a vehicle which is driven by an internal combustion engine, the vacuum produced in the suction pipe may serve in a conventional manner as auxiliary force and the monitoring installation may be constructed as diaphragm shifting device whereby a plunger connected with the diaphragm by way of a plate or disk opens or closes a valve plate in dependence on the prevailing vacuum.

According to a further feature of the present invention, the diaphragm shifting device includes an upper space which accommodates a spring projecting from the bottom of the upper space and supported against the bottom side of the plate whereby additionally a lower space is provided in which the valve plate provided preferably with an annular bead is pressed against its seat by the force of a curved spring disk.

A simple air guidance is achieved if the guidance of the plunger provided with at least one longitudinal groove is provided at its upper end with one or several cutouts or apertures.

Manufacturing tolerances of the valve plate do not decrease the air passage if the valve plate is provided with at least one recess or aperture at the circumference thereof.

Appropriately the curved spring disk is supported at the ring disk flange of a connecting pipe which outside of the abutment surface of the spring disk, is provided with at least one channel starting from the top side of the ring disk flange and leading to the bore of the connecting pipe nipple.

In another embodiment of the present invention, the curved spring disk is supported at a ring disk flange of a connecting pipe nipple whereby the top side of the ring disk flange is provided with at least one groove extending toward the bore of the connecting nipple.

Accordingly, it is an object of the present invention to provide a vehicle which avoids the aforementioned shortcomings and drawbacks encountered in the prior art.

Another object of the present invention resides in a control device which assures proper operation, in the order of their importance, of the adjusting mechanisms of a motor vehicle even if insufficient energy is present for the actuation of all of these servo devices connected to a single source of auxiliary force.

A further object of the present invention resides in a motor vehicle which is equipped with a control system that assures proper operation of the servo-assisted brakes even if the energy in the vacuum source decreases and even though other adjusting mechanisms of lesser importance are connected to the same vacuum source.

Still a further object of the present invention resides in a control device of the type described above which interrupts the supply of the auxiliary force to the lower-ranking adjusting mechanism or mechanisms of the motor vehicle when the energy of the auxiliary force decreases below a predetermined value.

Another object of the present invention resides in a control device of the type described above which is simple in construction, reliable in operation and relatively insensitive to manufacturing tolerances of its various component parts as regards its proper operations.

Figure 2:
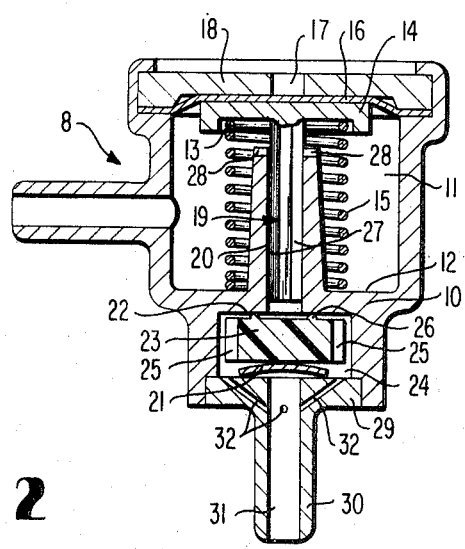

These and further objects, features, and advantages of the present invention will become more apparent from the following description when taken in connection with the accompanying drawing which shows, for purposes of illustration only, one embodiment in accordance with the present invention, and wherein:

FIG. 1 is a schematic view of a line system leading from a vacuum source to a preferred adjusting mechanism with a branch line to a further adjusting mechanism or mechanisms (not shown) under interposition of a monitoring and control installation in accordance with the present invention; and FIG. 2 is a cross-sectional view through a monitoring and control installation in accordance with the present invention.

Referring now to the drawing wherein like reference numerals are used throughout the two views to designate like parts, and more particularly to FIG. 1, a schematically illustrated motor vehicle generally designated by the reference character V is provided with an internal combustion engine 1' with a line 3 leading from the suction pipe 1 of the internal combustion engine 1' under interposition of a check valve 2 to a distributor member 4. A line 5 continuing in straight line terminates in a conventional brake apparatus 6, not illustrated in detail, whose vacuum chamber serves simultaneously as reservoir tank whereas a branch line 7 leads to a monitoring and control installation generally designated by reference numeral 8, from which a further line 9 may lead to one or several subordinate adjusting mechanisms 9.

These subordinate mechanisms 9', one of which is schematically illustrated in FIG. 1, may be used, for example, for the backrest lock and/or for the heat control. Furthermore, also the adjusting elements of a central locking system actuated by vacuum may be connected thereto which, however, are then to be considered again as higher-ranking in relation to the two last-mentioned adjusting mechanisms. To that end a monitoring and control installation 8 according to the present invention may then also be used between subordinate adjusting mechanisms 9 of unequal ranks.

As can be seen from FIG. 2, the monitoring and control installation 8 is constructed as diaphragm shifting device 10. An upper space 11 receives a spring 15 projecting up from the bottom 12 thereof and supported against the bottom side 13 of a plate or disk 14. The plate 14 abuts with its top side at a diaphragm 16 which is secured between the housing of the diaphragm shifting device 10 and the cover 18 thereof provided with a central aperture 17. A plunger generally designated by reference numeral 19 which projects down from the bottom side 13 of the plate 14 is received by a guide means 20 and, when actuated by vacuum, presses against a valve plate 23 opposite the force of a curved spring disk 21 which normally presses the valve plate against its seat 22; the valve plate 23 is thereby accommodated in the lower space 24 of the diaphragm shifting device 10. The valve plate 23 is provided at its circumference with at least one aperture or recess 25 provided for the passage of air and carries at its top side an annular bead 26. For the purpose of a simple air guidance, the plunger 19 is provided with longitudinal grooves 27, and the guide means 20 is provided at its upper end with several cutouts or apertures 28 in communication with the grooves 27. The lower termination of the diaphragm shifting device 10 is constituted by an annular disk flange 29 with a connecting pipe nipple 30. Several channels 32 terminating in the lower space 24 outside of the abutment surface of the spring disk 21, start from the bore 31 of the connecting pipe nipple 30.

In the position of the diaphragm shifting device 10 illustrated in FIG. 2, the upper space 11 is not acted upon with a vacuum or acted upon only with a slight vacuum. The diaphragm 16 abuts against the bottom side of the cover 18, and the annular bead 26 of the valve plate 23 is pressed against the seat 22. In relation to the arrangement of the example according to FIG. 1, the line 7 would then be separated from the line 9.

If the upper space 11 is acted upon with a vacuum which overcomes the spring force, then the diaphragm 16 and with it the disk 14 provided with the plunger 19 moves downwardly against the force of the spring 15 until the plunger 19 abuts against the top side of the valve plate 23. If the vacuum reaches a predetermined value, then the annular bead 26 of the valve plate 23 is lifted off from its seat 22. At this time the vacuum is conducted past the cutouts 28, along the longitudinal grooves 27 through the apertures 25 and the channels 32 to the bore 31.

If the vacuum drops below a predetermined value, then the plunger 19 moves upwardly and the annular bead 26 again comes into abutment at the seat 22. A further supply of vacuum to the adjusting mechanism or adjusting mechanisms connected downstream of the control device 8 is prevented thereby.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

What I claim is:

1. A motor vehicle driven by an internal combustion engine having a suction pipe for producing a vacuum auxiliary force, the vehicle including at least two adjusting mechanisms of unequal rank for the maintenance of the operating safety which are actuated by the auxiliary force, comprising: a line interconnecting the at least two adjusting mechanisms, a control means provided in said line leading to the respective subordinate adjusting mechanism, said control means including a housing having an upper and lower space, and means for interrupting the auxiliary force when the characteristic magnitude of said force reaches a predetermined value still sufficient for the satisfactory operation of the next-higher ranking adjusting mechanism, said last-mentioned means including a diaphragm shifting means, said diaphragm shifting means including a diaphragm disposed in said upper space, a plunger connected with said diaphragm by way of a plate, a valve plate means disposed in said lower space selectively actuated by said plunger in dependence on prevailing vacuum force, said control means further including means provided in said plunger for communicating said upper space with said lower space.

2. A vehicle according to claim 1, wherein a spring means is disposed within said upper space projecting up from the bottom thereof and supported against the bottom side of said plate, said lower space is provided with a valve seat, and wherein a spring disk is provided for pressing said valve plate means against said valve seat.

3. A vehicle according to claim 2, wherein said spring disk is curved.

4. A vehicle according to claim 3, wherein said valve plate means is provided with an annular bead.

5. A motor vehicle driven by an internal combustion engine having a suction pipe for producing a vacuum auxiliary force, the vehicle including at least two adjusting mechanisms of unequal rank for the maintenance of the operating safety which are actuated by auxiliary force, characterized in that a control means is provided in a line leading to the respective subordinate adjusting mechanism, said control means includes means for interrupting the auxiliary force when the characteristic magnitude of the auxiliary force reaches a predetermined value still sufficient for the satisfactory operation of the next-higher ranking adjusting mechanism, said last-mentioned means is constructed as a diaphragm shifting means which includes a diaphragm, a plunger connected with the diaphragm by way of a plate, said plunger actuating a valve plate means provided with an annular bead in dependence on the prevailing vacuum, said diaphragm shifting means further includes an upper space which accommodates a spring means projecting up from the bottom thereof and supported against the bottom side of the plate, and a lower space is provided in which the valve plate means is pressed against its seat by the force of a curved spring disk, said plunger is provided with at least one longitudinal groove, and guide means are provided for said plunger, said guide means being provided at its upper end with at least one aperture means.

6. A vehicle according to claim 5, characterized in that the guide means is provided at its upper end with several aperture means.

7. A vehicle according to claim 5, characterized in that the valve plate means is provided at its circumference with at least one aperture means.

8. A vehicle according to claim 7, characterized in that the spring disk is supported at a ring disk flange of a connecting pipe, and in that at least one channel leading to the bore of the connecting pipe is provided which starts from the top side of the ring disk flange.

9. A vehicle according to claim 7, characterized in that the curved spring disk is supported at a ring disk flange of a connecting pipe, and in that the top side of the ring disk flange is provided with at least one groove extending toward the bore of the connecting pipe.

10. A vehicle with at least two adjusting mechanisms of unequal rank for the maintenance of the operating safety which are actuated by an auxiliary force, characterized in that a control means is provided in a line leading to the respective subordinate adjusting mechanism, said control means including means for interrupting the auxiliary force when the characteristic magnitude of the auxiliary force reaches a predetermined value still sufficient for the satisfactory operation of the next-higher ranking adjusting mechanism, said last-mentioned means is constructed as a diaphragm shifting means which includes a diaphragm, a plunger connected with the diaphragm by way of a plate, said plunger actuating a valve plate means in dependence on the prevailing auxiliary force, said plunger is provided with at least one longitudinal groove, and guide means for said plunger, said guide means being provided at its upper end with at least one aperture means.

11. A vehicle according to claim 10, characterized in that the diaphragm shifting means includes an upper space which accommodates a spring means projecting up from the bottom thereof and supported against the bottom side of the plate, and in that additionally a lower space is provided in which the valve plate means is pressed against its seat by the force of a spring disk.

12. A vehicle according to claim 11, characterized in that the spring disk is curved.

13. A vehicle according to claim 11, characterized in that the valve plate means is provided with an annular bead.

14. A vehicle according to claim 11, characterized in that the spring disk is supported at a ring disk flange of a connecting pipe, and in that at least one channel leading to the bore of the connecting pipe is provided which starts from the top side of the ring disk flange.

15. A vehicle according to claim 11, characterized in that the curved spring disk is supported at a ring disk flange of a connecting pipe, and in that the top side of the ring disk flange is provided with at least one groove extending toward the bore of the connecting pipe.

16. A vehicle according to claim 10, characterized in that the guide means is provided at its upper end with several aperture means.

17. A vehicle according to claim 10, characterized in that the valve plate means is provided at its circumference with at least one aperture means.

18. A vehicle having at least two adjusting mechanisms of unequal rank operatively interconnected with a common force producing means, comprising: control means operatively connected to said adjusting mechanisms and said common force producing means, said control means including a housing, said housing being divided into an upper space portion and a lower space portion, said control means further including diaphragm means disposed in said upper space portion, valve means disposed in said lower space portion, and means for operatively connecting said diaphragm means with said valve means, said connecting means including means for communicating said upper space portion with said lower space portion.

19. A vehicle according to claim 18, wherein said common force producing means includes a vacuum source operatively interconnected with said adjusting mechanisms.

20. A vehicle according to claim 18, wherein said housing includes a cover plate means disposed therein above said upper spaced portion, and wherein said means for operatively connecting said diaphragm and said valve means includes a plunger disposed between said diaphragm means and said valve means.

21. A vehicle according to claim 20, wherein said plunger is provided with a plate portion at one end thereof, said diaphragm means being disposed between said plate portion and said cover plate.

22. A vehicle according to claim 21, wherein a spring is provided in said upper space portion between the bottom thereof and said plate portion and wherein said valve means includes a valve plate and a valve seat provided in said lower space portion.

23. A vehicle according to claim 22, wherein additional spring means are provided for normally pressing said valve plate against said valve seat.

24. A vehicle according to claim 23, wherein said spring means is a spring disk.

25. A vehicle according to claim 24, wherein said spring disk is curved.

26. A vehicle according to claim 25, wherein said valve plate is provided with an annular bead.

27. A vehicle having at least two adjusting mechanisms of unequal rank operatively interconnected with a common force producing means including a vacuum source, comprising: control means operatively connected to said adjusting mechanisms and said force producing means, said control means including a housing being divided into an upper space portion and a lower space portion, said control means further including means for interrupting the force supplied to the lower ranking adjusting mechanism when the force produced by said force producing means decreases below a predetermined value, said last mentioned means including a diaphragm means disposed in said upper space portion, valve means disposed in said lower space portion, and a plunger disposed between said diaphragm means and said valve means for operatively connecting the same, said valve means including a valve plate and a valve seat provided in said lower space portion, said housing including a cover plate means disposed therein above said upper space portion, said plunger being provided with a plate portion at one end thereof with said diaphragm means being disposed between said plate portion and said cover plate means, a spring provided in said upper space portion between the bottom thereof and said plate portion, and additional curved spring disk means for normally pressing said valve plate against said valve seat, said housing further including a guide means disposed in said upper space portion for guiding said plunger, and means on said plunger and said guide means for communicating said upper space portion with said lower space portion.

28. A vehicle according to claim 27, wherein said means for communicating includes at least one longitudinal groove provided in said plunger and at least one aperture is provided at the upper end of said guide means.

29. A vehicle according to claim 28, wherein a plurality of apertures are provided on said guide means.

30. A vehicle according to claim 29, wherein said valve plate is provided with at least one aperture means.

31. A vehicle according to claim 30, wherein said aperture in said valve plate is provided at the circumference thereof.

32. A vehicle according to claim 31, wherein a connecting pipe is provided and disposed in said housing in the lower space portion thereof, said connecting pipe being provided with a ring disk flange means for supporting said spring disk and wherein means are provided for communicating said lower space portion with said connecting pipe.

33. A vehicle according to claim 32, wherein said last mentioned communicating means includes a channel starting from the top side of said rink disk flange means and extending to a bore of said connecting pipe.

34. A vehicle according to claim 32, wherein said last-mentioned communicating means includes at least one groove provided in the top side of said ring disk flange means, said groove extending toward a bore of said connecting pipe.

* * * * *